(12) United States Patent
Yamakawa

(10) Patent No.: US 8,817,276 B2
(45) Date of Patent: Aug. 26, 2014

(54) IMAGE PROCESSING APPARATUS AND DATA PROCESSING METHOD FOR MANAGING LOG INFORMATION RELATED TO A JOB PROCESSING REQUEST

(75) Inventor: Junichi Yamakawa, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1353 days.

(21) Appl. No.: 11/747,027

(22) Filed: May 10, 2007

(65) Prior Publication Data

US 2007/0273921 A1 Nov. 29, 2007

(30) Foreign Application Priority Data

May 24, 2006 (JP) ................................. 2006-143989

(51) Int. Cl.
*G06F 3/12* (2006.01)
(52) U.S. Cl.
USPC .......................................... 358/1.12; 358/1.1
(58) Field of Classification Search
USPC ....................................................... 358/1.15
See application file for complete search history.

(56) References Cited

U.S. PATENT DOCUMENTS

| | | | | |
|---|---|---|---|---|
| 6,020,973 | A * | 2/2000 | Levine et al. | 358/1.15 |
| 7,664,825 | B2 * | 2/2010 | Yeung et al. | 709/217 |
| 8,271,797 | B2 * | 9/2012 | Araki et al. | 713/182 |
| 2002/0036793 | A1 * | 3/2002 | Roosen et al. | 358/1.15 |
| 2005/0111051 | A1 * | 5/2005 | Uchikawa | 358/448 |
| 2005/0231747 | A1 * | 10/2005 | Bledsoe et al. | 358/1.13 |
| 2006/0168651 | A1 * | 7/2006 | Araki et al. | 726/6 |

FOREIGN PATENT DOCUMENTS

| | | |
|---|---|---|
| JP | 2000-284928 | 10/2000 |
| JP | 2003-186637 A | 7/2003 |
| JP | 2005-157569 | 6/2005 |
| JP | 2005-244478 A | 9/2005 |

* cited by examiner

*Primary Examiner* — Marcus T Riley
(74) *Attorney, Agent, or Firm* — Canon U.S.A., Inc. IP Division

(57) ABSTRACT

A data processing system includes a thin-client machine, a management server configured to manage the thin-client machine, an image processing apparatus configured to process job information, and a job management apparatus configured to manage a processing result of the job information. In the data processing system, when the job information is processed according to an instruction from the thin-client machine, the job management apparatus receives the processing result of the job information and information for identifying image data related to the job information from the management server and manages the received processing result and the information for identifying the image data related to the job information as a job log.

5 Claims, 13 Drawing Sheets

FIG. 4

| | TAG NAME | ITEM | EXAMPLE 1 |
|---|---|---|---|
| 4001 | JobKind | JOB KIND | PDL-PRINT |
| 4002 | JobName | JOB NAME | Word-Document |
| 4003 | ClientName | JOB REQUESTING PERSON | SUZUKI Hajime |
| 4004 | CharacterCode | CHARACTER CODE INFORMATION | Shift_JIS |
| 4005 | SectionNo | SECTION CODE | 1054 |
| 4006 | StartTime | JOB START TIME (COMMUNICATION START TIME) | 2004/10/15 08:05:40 |
| 4007 | EndTime | JOB END TIME (COMMUNICATION END TIME) | 2004/10/15 08:10:30 |
| 4008 | Result | JOB RESULT | OK |
| 4009 | ResourceCount | NUMBER OF PAGES PER ONE COPY | 10 |
| 4010 | Copies | NUMBER OF COPIES | 5 |
| 4011 | Protocol | COMMUNICATION METHOD | LPR |
| 4012 | ComType | COMMUNICATION TYPE | - |
| 4013 | LineInfo | LINE NUMBER USED | - |
| 4014 | NoticeAddress | ADDRESS AND TELEPHONE NUMBER OF SENDING DESTINATION (RECEIVING SOURCE) | - |
| 4015 | ComAbbreviation | NAME OF SENDING DESTINATION (RECEIVING SOURCE) | - |
| 4016 | Subject | SUBJECT | - |
| 4017 | PathName | IMAGE PATH NAME (IMAGE STORING DESTINATION INFORMATION) | - |
| 4018 | DeviceName | DEVICE NAME | CENTER-MFP5 |
| 4019 | DeviceSerialNo | DEVICE SERIAL NUMBER | MKJ001234 |
| 4020 | DeviceAddress | DEVICE ADDRESS | 88.125.9.45 |
| 4021 | DocumentID | DOCUMENT ID | MKJ001234041015080540000001589 |
| 4022 | JobInformation | DETAILED JOB INFORMATION | FORM-COMPOSITION |

FIG. 5

|  | EXAMPLE 2 | EXAMPLE 3 |
|---|---|---|
| 5001 | I-FAX | FAX |
| 5002 | - | - |
| 5003 | - | TACHIBANA Akira |
| 5004 | Shift_JIS | Shift_JIS |
| 5005 | - | 0332 |
| 5006 | 2004/10/16 20:10:22 | 2004/10/16 21:10:24 |
| 5007 | 2004/10/16 20:11:30 | 2004/10/16 21:15:30 |
| 5008 | Canceled | OK |
| 5009 | 1 | 4 |
| 5010 | 1 | 1 |
| 5011 | I-FAX | FAXG3 |
| 5012 | Receive | Send |
| 5013 | - | 0447336111 |
| 5014 | xxxyyy@zzzcompany.com | 0337582111 |
| 5015 | Thomas Anderson | Head Office |
| 5016 | Shipping document | - |
| 5017 | /IFAX/HOME/05/ | - |
| 5018 | CENTER-MFP5 | CENTER-MFP5 |
| 5019 | MKJJ001234 | MKJJ001234 |
| 5020 | 88.125.9.45 | 88.125.9.45 |
| 5021 | MKJJ00123404101620102200000001592 | MKJJ00123404101621102400000001593 |
| 5022 | - | - |

FIG. 7

| JOB KIND | JOB TYPE | RECORD ACTUAL IMAGE |
|---|---|---|
| COPY JOB | INPUT JOB | YES |
| FIRST PDL-PRINT JOB | INPUT JOB | YES |
| SCAN JOB/BOX STORING JOB/FORM REGISTRATION JOB | INPUT JOB | YES |
| RECEIVING JOB (FAX/I-FAX) | INPUT JOB | YES |
| SENDING JOB (FAX/I-FAX/SEND) | OUTPUT JOB | NO |
| BOX-PRINT JOB AND RECEIVED PRINT JOB | OUTPUT JOB | NO |
| SECOND PDL-PRINT JOB | INPUT JOB | YES/NO |

IMAGE PROCESSING APPARATUS AND DATA PROCESSING METHOD FOR MANAGING LOG INFORMATION RELATED TO A JOB PROCESSING REQUEST

BACKGROUND OF THE INVENTION

1. Field of the Invention

The present invention relates to a method of processing a job in a data processing system including an image processing apparatus configured to perform job information processing requested by a thin-client machine.

2. Description of the Related Art

In recent years, as high performance personal computers (PCs) have been widely used in corporations, operation costs and management costs for installing and upgrading application software and maintaining hardware have increased.

In this regard, a concept of "thin client" has been introduced. In this concept, an inexpensive personal computer (PC) having minimum functions such as displaying and inputting is provided for use by a rank-and-file employee. Using thin-client machines, resources such as application software are centrally managed by a server, and thus operation and management costs can be reduced.

Considering reduction of operation and management costs for PCs and management of information on a client PC, a "server-based computing" system, in which thin-client machines are used as PCs used by each user and a server centrally manages data, application software, and so on, attracts much attention.

In the server-based computing system, applications, which are conventionally installed on a client PC, are all installed on a server (application server).

A thin-client machine sends only contents of operations made via a mouse or a keyboard to the server and receives, from the server, only data to be displayed on the screen of the thin-client machine according to the operation of the mouse or the keyboard.

Accordingly, the amount of data sent and received between a client PC and the server can be significantly reduced. Thus, response between a client PC and the server can be faster. That is, no application software operates on a client PC. Accordingly, the response between a client PC and the server does not become slow even when a relatively low performance client PC is used or when the state of communication is somewhat bad.

Furthermore, because all application software is installed on the server, application software can be upgraded by upgrading on the server only. Moreover, all the operations by a client PC are made via the server. Accordingly, the server can perform management as to who has handled which document or image. Thus, leakage of confidential information can be more efficiently reduced.

In this regard, Japanese Patent Application Laid-Open No. 2000-284928 discusses a print system using a thin-client.

Meanwhile, as a multifunction peripheral having a copy function and an image transmission function has been widely used, any user can easily copy and send an original document.

A multifunction peripheral can improve a user's convenience. However, information leakage by copying and sending a confidential document is likely to occur.

In order to address such a problem, Japanese Patent Application Laid-Open No. 2005-157569 discusses a method in which all read image data, printed image data, and sent image data is stored at the time of copying and sending thereof in addition to a job history (job log). With such a method, information as to who has performed what processing at which place and at what time in a system can be recorded. A function for storing and managing a history related to a job processed by an apparatus together with and linked to image data related thereto is hereinafter referred to as a "job archiving function".

When the job archiving function is operated in a system including a thin client described above, it is required to provide the system with a large capacity storage device. Thus, costs of manufacture of the system adversely increases. That is, both a server apparatus that manages a thin client and a storage device that stores a job log using the job archiving function store image data related to a job. Accordingly, a large capacity storage device is required.

In addition, in order to manage all job histories in a system using the job archiving function, it is necessary to have all apparatuses that process a job in the system correspond to the job archiving function. That is, it is necessary to provide each apparatus with a function for storing in a storage device a result of processing or image data when a job is processed.

SUMMARY OF THE INVENTION

The present invention is directed to an image processing apparatus and a data processing method capable of managing log information related to a job processing request from a thin client machine with an effective use of a memory resource.

According to an aspect of the present invention, an image processing apparatus configured to receive job information from a thin-client machine via a management server for managing the thin-client machine and to receive job information from a non thin-client machine to process the received job information includes: a determination unit configured to determine whether job information to be processed is sent from a thin-client machine or from a non thin-client machine; and a registration unit configured to register image data related to the job information and a processing result of the job information as a log of the job information to a storage unit if the determination unit determines that the job information is sent from the non thin-client machine and to register information for identifying image data stored in the management server and related to the job information and a processing result of the job information as a log of the job information to the storage unit if the determination unit determines that the job information is sent from the thin-client machine.

According to another aspect of the present invention, a data processing method of a job management apparatus in a data processing system including the job management apparatus configured to manage a job log by registering the job log to a storage unit, an image processing apparatus configured to process job information, and a server apparatus configured to manage a thin-client machine, includes: receiving, from the server apparatus, information for identifying image data related to the job information and a processing result of the job information processed by the image processing apparatus according to an instruction from the thin-client machine; storing the information for identifying the image data and the processing result to the storage unit; and managing the information for identifying the image data and the processing result as the job log.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 4 illustrates an example of a log record stored in the storage server illustrated in FIG. 1 according to the first exemplary embodiment of the present invention.

FIG. 5 illustrates an example of a log record stored in the storage server illustrated in FIG. 1 according to the first exemplary embodiment of the present invention.

FIG. 7 illustrates an example of data stored in a security unit illustrated in FIG. 6 according to the first exemplary embodiment of the present invention.

DETAILED DESCRIPTION OF THE EMBODIMENTS

Various exemplary embodiments, features and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

First Exemplary Embodiment

Figure 1:
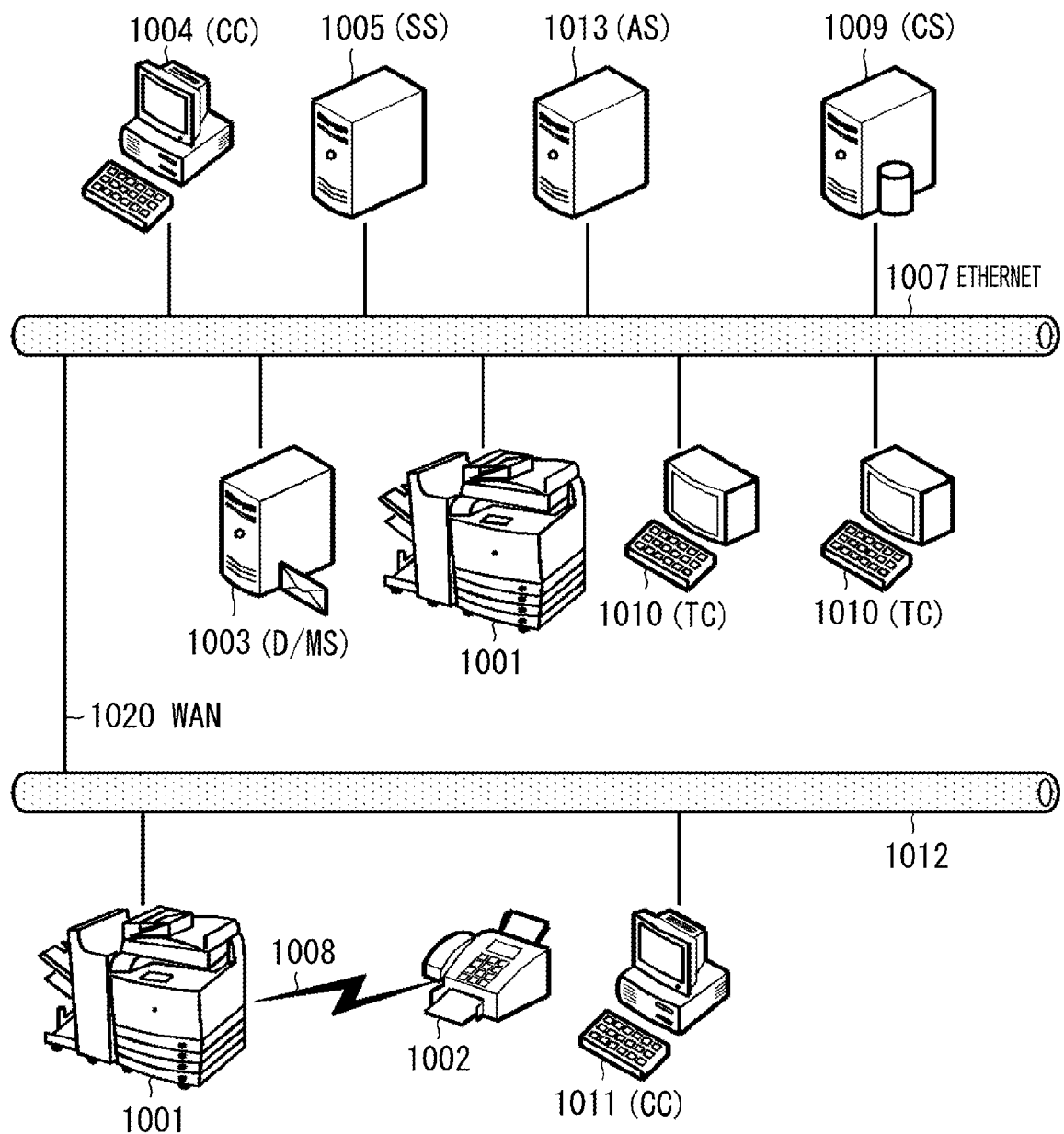
FIG. 1 illustrates an exemplary configuration of a data processing system according to a first exemplary embodiment of the present invention.

Now, a first exemplary embodiment of the present invention will be described below. FIG. 1 illustrates an exemplary configuration of a data processing system according to the first exemplary embodiment of the present invention. In the data processing system, a server apparatus, an image processing apparatus, and a client machine are in communication with each other via a local area network (LAN) and a wide area network (WAN).

Referring to FIG. 1, a multifunction peripheral 1001 is capable of reading an original document, generating a copied document by printing the read original document, printing print data (page description language (PDL) data) received from an external apparatus, and sending image data to various apparatuses via a LAN and a WAN. Image data can be sent by facsimile in G3 and G4 standards and by e-mail in a simple mail transfer protocol (SMTP). In addition, image data can be sent in a file transfer protocol (FTP), a server message block (SMB), and a world wide web distributed authoring and versioning protocol (WebDAV). Furthermore, image data can be received via facsimile and e-mail conforming to the SMTP and a post office protocol version 3 (POP3) standards. In addition, image data can be sent and received via e-mail through Internet FAX (I-FAX) conforming to T.37 of International Telecommunication Union-Telecommunication Standardization Sector (ITU-T).

The multifunction peripheral 1001 includes a hard disk drive (HDD). The HDD includes a plurality of boxes. In each of the boxes, image data input by a scanner connected to the multifunction peripheral 1001 and image data externally input can be stored. The multifunction peripheral 1001 can print the image data stored in the box using a printer connected to the multifunction peripheral 1001 and send the stored image data to an external apparatus. In addition, the multifunction peripheral 1001 has a function for reading an original document using a scanner connected to the multifunction peripheral 1001 according to an instruction generated by a scanner driver installed on an external PC to send an image of the read original document to the external PC.

A database/mail server (D/MS) 1003 is a computer on which a server storing data read by the multifunction peripheral 1001 operates.

A client computer (CC) 1004 is in communication with the D/MS 1003 and is capable of downloading and displaying the data stored in the D/MS 1003. The CC 1004 is installed with application software and a printer driver. Using the CC 1004, a user can create a document and generate print data. The user can generate and issue a command for printing the print data generated using the printer driver to the multifunction peripheral 1001.

A storage server (SS) 1005 stores all image data input and output by the multifunction peripheral 1001, linking the image data with job detailed information (log record). The SS 1005 records an apparatus that has processed a job, date and time of the processing, and a content of the processing, as the job detailed information. A chasing server (CS) 1009 receives and arranges the data stored in a plurality of storage servers (SSs) 1005. The user can trace a log as to which image data is processed by which apparatus in what type of processing on what date and time, by referring to the log record stored in the CS 1009.

When the CS 1009 performs character recognition processing and image recognition processing on image data received by the SS 1005 and detects a specific keyword and a specific image, it is determined that confidential information is likely to be leaked. In this case, the multifunction peripheral 1001 can send a message indicating it is likely that a leakage of confidential information has occurred to an administrator of the system via e-mail. After receiving the message, if the administrator of the system determines that an image including a keyword and an image whose leakage is inhibited is printed and sent, the administrator of the system can trace the log of the inhibited printing and sending of the image. With this function, leakage of confidential information to a user using the multifunction peripheral 1001 can be effectively prevented.

As described above, the data processing system supports the job archiving function in which a log of a job processed by a multifunction peripheral is stored together with image data related to the job.

An Ethernet 1007 is a network via which the multifunction peripheral 1001, the D/MS 1003, the CC 1004, the SS 1005, and the CS 1009 are in communication with one another.

A CC 1011 is installed with application software and a printer driver just as the CC 1004. A user of the CC 1011 can generate a print output command, a FAX transmission command, and an I-FAX (Internet FAX) transmission command via the CC 1011. The multifunction peripheral 1001 and the CC 1011 are in communication with each other via an Ethernet 1012.

A facsimile 1002 can perform a facsimile transmission via a public line (public switched telephone network (PSTN)) 1008. The Ethernet 1007 and the Ethernet 1012 are in communication with each other via a WAN 1020.

An application server (AS) 1013 is used in a server-based computing system. The AS 1013 is installed with the application software and driver software installed in an ordinary client computer (CC 1004). The application software and driver software can be utilized via a thin client computer (TC) 1010.

The TC 1010 receives data to be displayed on a screen thereof from the AS 1013 via the Ethernet 1007. Operation information of a mouse or a keyboard (content of operations made by a user of the TC 1010) is sent from the TC 1010 to the AS 1013. The AS 1013 sends screen data according to the received operation information to the TC 1010. Information issued from the TC 1010 (including job information and image data related to the job) is managed linked with information for identifying the TC 1010 by the AS 1013. The AS 1013 permits only a TC that is previously registered as an authenticated client computer to access the AS 1013.

Figure 2:
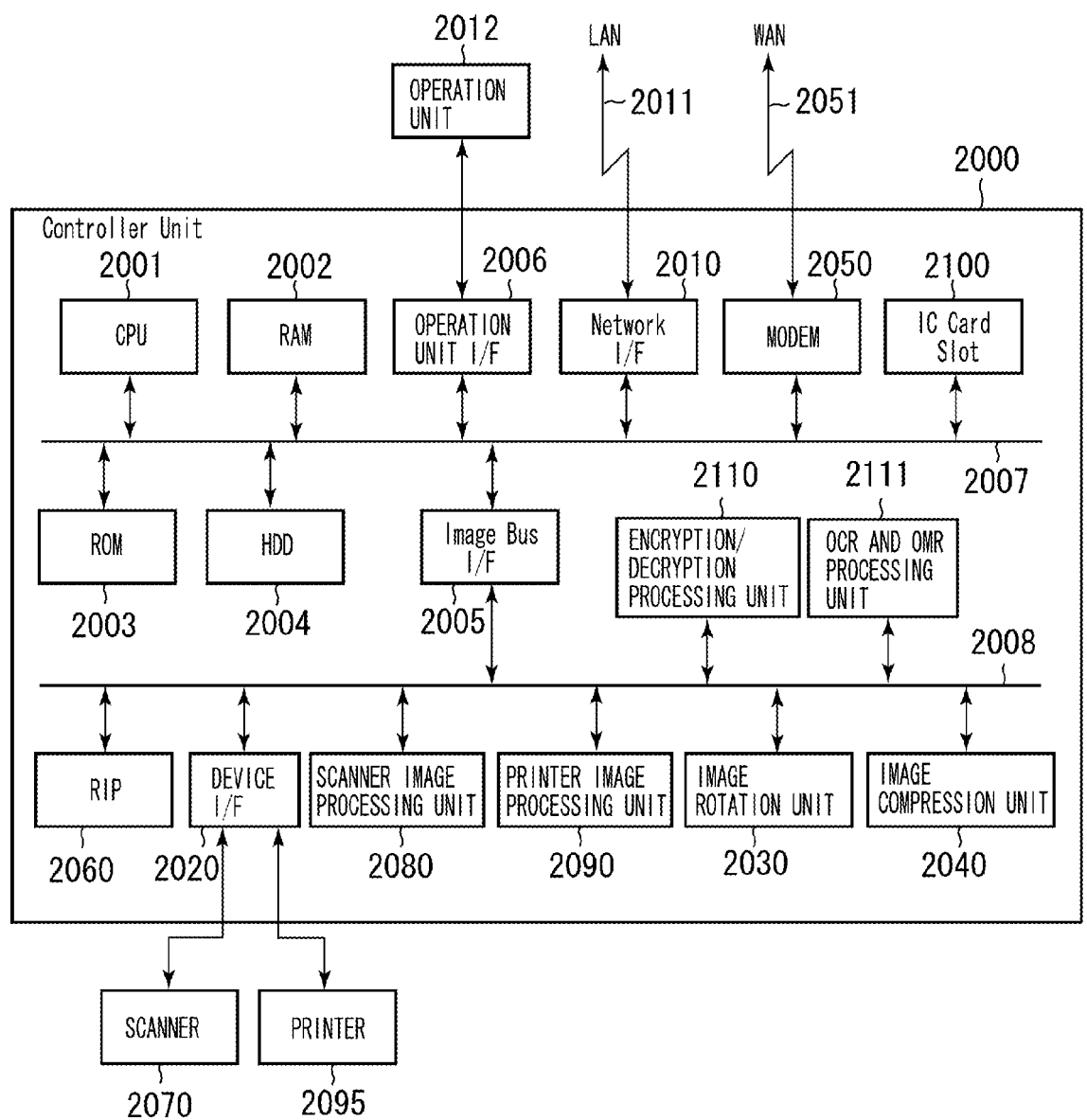
FIG. 2 illustrates an exemplary configuration of a multifunction peripheral illustrated in FIG. 1 according to the first exemplary embodiment of the present invention.

FIG. 2 illustrates an exemplary configuration of the multifunction peripheral 1001 illustrated in FIG. 1.

Referring to FIG. 2, the multifunction peripheral 1001 includes a controller unit (CU) 2000. The CU 2000 is in communication with a scanner 2070, which is an image input device, and a printer 2095, which is an image output device. The CU 2000 controls image input and output processing using the scanner 2070 and 2095 and the operation of the multifunction peripheral 1001.

The CU 2000 includes a central processing unit (CPU) 2001. The CPU 2001 executes a program for controlling the multifunction peripheral 1001. In addition, the CU 2000 includes a random access memory (RAM) 2002. The RAM 2002 is a system work memory used by the CPU 2001 for executing the control program. The RAM 2002 is also an image memory for temporarily storing image data.

A read-only memory (ROM) 2003 is a boot ROM used for storing a boot program for the multifunction peripheral 1001. A hard disk drive (HDD) 2004 is used for storing system software and image data.

An operation unit interface (I/F) 2006 is an interface to an operation unit (user interface (UI)) 2012 including a touch panel. The operation unit I/F 2006 outputs image data to be displayed on the operation unit 2012, which is stored in the RAM 2002 or the HDD 2004, to the operation unit 2012. In addition, the operation unit I/F 2006 sends information entered by a user via the operation unit 2012 to the CPU 2001.

A network I/F 2010 is connected to a LAN 2011, and is used for inputting and outputting information. A modem 2050 is connected to a public line 2051, and is used for inputting and outputting information. The above-described devices are in communication with each other via a system bus 2007.

The system bus 2007 and an image bus 2008, which transmits image data at a high speed, are in communication with each other via an image bus I/F 2005 to convert a data structure. The image bus 2008 includes a peripheral component interconnect (PCI) bus or Institute of Electrical and Electronics Engineers (IEEE) 1394 bus. The following component devices are mutually connected on the image bus 2008.

A raster image processor (RIP) 2060 rasterizes PDL code into a bitmap image. A device I/F unit 2020 connects the scanner 2070 and the printer 2095, which are an image input device and an image output device, respectively, to the CU 2000.

A scanner image processing unit 2080 corrects, processes, and edits image data input via the scanner 2070. A printer image processing unit 2090 corrects print output image data and converts a resolution of the print output image data to enable printing of the print output image data by the printer 2095.

An image rotation unit 2030 rotates image data. An image compression unit 2040 compresses multivalued image data into Joint Photographic Experts Group (JPEG) image data and binary image data into Joint Bi-level Image Experts Group (JBIG) image data, Modified Modified Read (MMR)-coded image data, or modified Huffman coding (MH)-coded image data. In addition, the image compression unit 2040 decompresses compressed image data.

An integrated circuit (IC) card slot 2100 is used for user authentication using an IC card medium. With the user authentication, a user can be identified as an authentic user at the time of processing a job.

The user can input and output a key used for coding and decoding by entering an appropriate personal identifier number (PIN) code after inserting an IC card medium into the IC card slot 2100.

An encryption/decryption processing unit 2110 encrypts or decrypts data using a key related to the IC card slot 2100 and a key unique to the multifunction peripheral 1001.

An optical character recognition (OCR) and optical mark reading (OMR) processing unit 2111 reads and decodes character information and two-dimensional bar code included in image data to code the read character information and two-dimensional bar code into character code.

Figure 3:
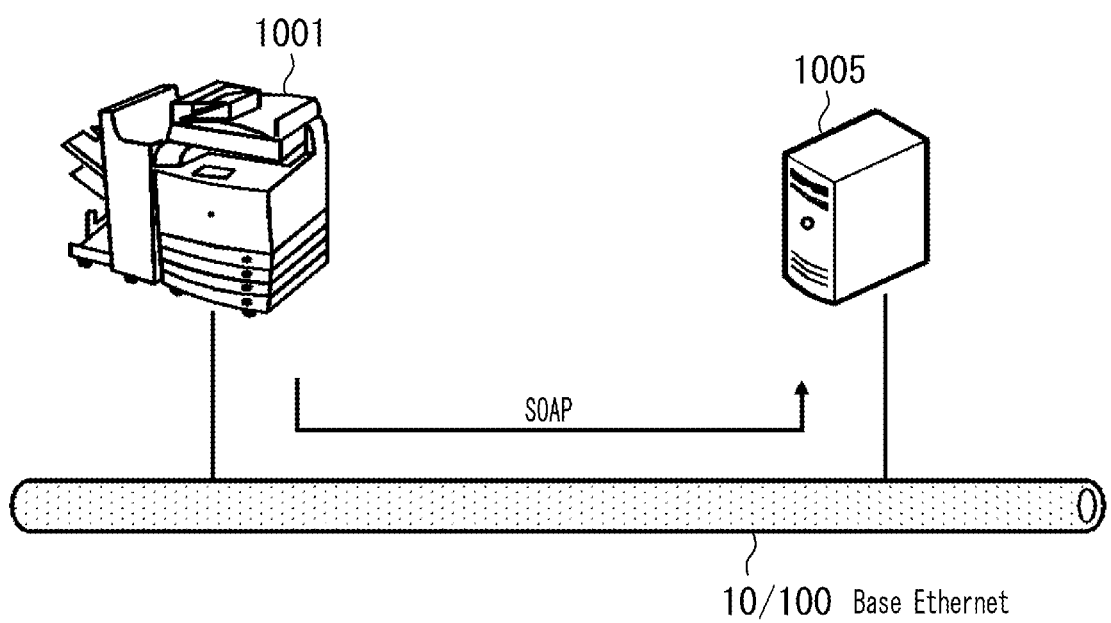
FIG. 3 illustrates an exemplary configuration of a data processing system in a case where the multifunction peripheral illustrated in FIG. 1 writes image data and job detailed information on a storage server according to the first exemplary embodiment of the present invention.

FIG. 3 illustrates an exemplary configuration of a data processing system in a case where the multifunction peripheral 1001 illustrated in FIG. 1 writes image data and job detailed information on the SS 1005.

In this example, Simple Object Access Protocol (SOAP) is used as a protocol for storing the image data and the job detailed information (log record) from the multifunction peripheral 1001 to the SS 1005.

However, the present exemplary embodiment is not limited to this configuration. That is, an existing protocol with which data can be transmitted can be used. In addition, Secure Sockets Layer (SSL) protocol can be used in encrypting processing as necessary. Furthermore, the data stored in the SS 1005 can be encrypted to be stored.

In the present exemplary embodiment, the multifunction peripheral 1001 and the SS 1005 are provided separately from each other. However, the functions of the SS 1005 can be included in the multifunction peripheral 1001 by providing the multifunction peripheral 1001 with a large capacity memory and applications for functioning as a storage server.

Setting information required for accessing the SS 1005 is protected so that only a system administrator of the multifunction peripheral 1001 can perform setting thereof.

FIG. 4 illustrates an example of a first log record stored in the SS 1005 illustrated in FIG. 1. In the example in FIG. 4, items 4001 through 4022 are illustrated as log record items. However, another item can be used and added hereto. Hereinbelow, with respect to each of the items 4001 through 4022, a tag name, details of the item, and an example are described. In a tag name column, a tag name corresponding to each item is described. Hereinbelow, management data used in a case where a job processing request issued to the multifunction peripheral 1001 is managed by the SS 1005 is described.

Referring to FIG. 4, a job kind item 4001 describes a kind of job such as "COPY", "FAX", and "PDL". A tag name for the job kind item 4001 is "[JobKind]".

A job name item 4002 describes a name of a processed job. A tag name for the job name item 4002 is "[JobName]". A job requesting person item 4003 describes a name of a user of the processed job. A tag name for the job requesting person item 4003 is "[ClientName]". The job requesting person 4003 is obtained by user authentication performed in using the multifunction peripheral 1001 or obtained based on a user name included in job information received from the CC 1004, the CC 1011, or the TC 1010.

A character code information item 4004 describes information about character code used in the present record. A tag name for the character code information item 4004 is "[CharacterCode]". A section code item 4005 describes a code of a section to which the user belongs. A tag name for the section code item 4005 is "[SectionNo]".

A job start time item 4006 describes a start time of the job. A tag name for the job start time item 4006 is "[StartTime]". A job end time item 4007 describes a time at which the job ends. A tag name for the job end time item 4007 is "[EndTime]".

A job result item 4008 describes a result of the job such as "OK", "NG", and "Canceled". A tag name for the job end result item 4008 is "[Result]". A number of pages per one copy item 4009 describes the number of pages included in the job. A tag name for the number of pages per one copy item 4009 is "[ResourceCount]".

A number of copies item 4010 describes how many copies are set to be output. A tag name for the number of copies item 4010 is "[Copies]". A communication method item 4011 describes a communication method (communication protocol). A tag name for the communication method item 4011 is "[Protocol]".

A communication type item 4012 describes whether the communication is sending or receiving of data. A tag name for the communication type item 4012 is "[ComType]". A line number used item 4013 describes a telephone number used. A tag name for the line number used item 4013 is "[LineInfo]".

A sending destination (receiving source) address and telephone number item 4014 describes an address and a telephone number of a sending destination (receiving source). A tag name for the sending destination (receiving source) address and telephone number item 4014 is "[NoticeAddress]". A sending destination (receiving source) name item 4015 describes a name of a sending destination (receiving source). A tag name for the sending destination (receiving source) name item 4015 is "[ComAbbreviation]".

A subject item 4016 describes a subject in a header portion of an e-mail job. A tag name for the subject item 4016 is "[Subject]". An image path name item 4017 describes an image storing destination in an image storing job. A tag name for the image path name item 4017 is "[PathName]".

A device name item 4018 describes a name provided to the apparatus that processes the job. A tag name for the device name item 4018 is "[DeviceName]". A device serial number item 4019 describes a serial number unique to the apparatus that processes the job. A tag name for the device serial number item 4019 is "[DeviceSerialNo]".

A device address item 4020 describes an Internet protocol (IP) address of the apparatus that processes the job. A tag name for the device address item 4020 is "[DeviceAddress]". A document identification (ID) item 4021 describes an ID used for identifying a document handled in the job. When a plurality of documents are handled in a job, by describing a plurality of document IDs in the document ID item 4021, it can be identified that a plurality of documents are handled in the job. A tag name for the document ID item 4021 is "[DocumentID]".

A document ID is described in a 32-digit American Standard Code for Information Interchange (ASCII) character string including a "device serial number (in 10-digit ASCII characters)"+"date and time of creation of a document (yymmddhhmmss) (in 12-digit ASCII characters)"+"serial number that the apparatus increments per one job (in 10-digit ASCII characters)". The document creation date and time indicates a date and time on which a job is processed (including information on date, time, minute and second). Using the document ID, the administrator of the system can easily identify which corresponding job is processed by which apparatus on what date and time.

A detailed job information item 4022 describes specific detailed information about the job. In the example in FIG. 4, a text string "FORM-COMPOSITION" is described, which indicates composition of a form in which a previously registered form image is composed on an image of an input job page by page to be output. A tag name for the detailed job information item 4022 is "[JobInformation]".

It is not necessary to use all the items 4001 through 4022. When one of the items 4001 through 4022 is not used, the non-used item is recorded as having no content.

FIG. 5 illustrates an example of a second log record stored in the SS 1005 illustrated in FIG. 1. In this example, log codes corresponding to the items 4001 through 4022 are illustrated as log record items. Another item can be added and used. Items 5001 through 5022 correspond to the items 4001 through 4022, respectively.

In FIG. 4 and FIG. 5, different job kinds, which are indicated as the item 4001 and the item 5001, are described for examples 1, 2, and 3. Thus, the item to be used differs according to a kind of job.

For example, in a FAX job in example 3, in the line number used in the item 5013, a telephone number of the multifunction peripheral 1001 is recorded, and in the sending destination (receiving source) address in the item 5014, a telephone number of the sending destination (receiving source) is recorded.

Figure 6:
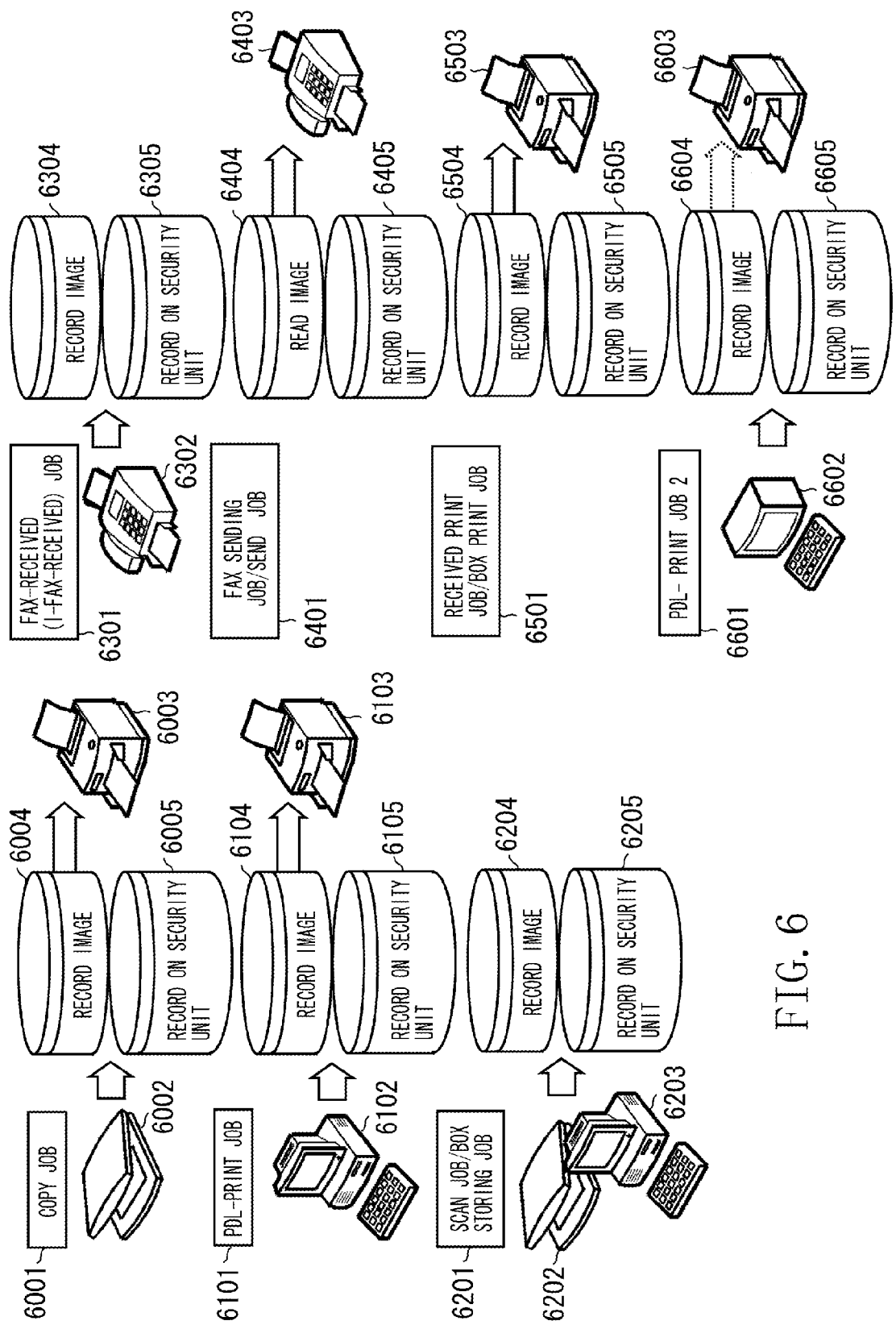
FIG. 6 illustrates a data flow for each job kind when a security function is active according to the first exemplary embodiment of the present invention.

FIG. 6 illustrates a data flow for each job kind when a security function in the data processing system according to the present exemplary embodiment is active. In the present exemplary embodiment, a user can select between a security function active mode and a security function disabled mode via the operation unit 2012. In FIG. 6, a scanner and a printer are separately illustrated. However, the scanner and the printer in FIG. 6 may correspond to a scanner and a printer included in one multifunction peripheral.

Referring to FIG. 6, in a COPY job 6001, image data input from a scanner 6002 is temporarily recorded and stored in an HDD 6004, and subsequently, the stored image data is output to a printer 6003.

During processing of a job, the log record described with reference to FIGS. 4 and 5 and the image data input from the scanner 6002 are recorded on a security unit 6005. The security unit collectively refers to a security unit having functions equivalent to those provided in the SS 1005 illustrated in FIG. 1.

In a PDL print job 6101, PDL data sent from a host 6102 is rasterized to generate printable image data. Then, the rasterized image data is temporarily recorded and stored on an HDD 6104. Subsequently, the stored image data is output to a printer 6103.

During processing of a job, the log record described with reference to FIGS. 4 and 5 and the rasterized image data are recorded on a security unit 6105.

In a Job 6201 including a SCAN job or a BOX storing job, image data input from a scanner 6202 or image data obtained by rasterizing PDL data sent from a host 6023 together with an instruction for storing the PDL data into a BOX is recorded on an HDD 6204. During processing of a job, the log record described with reference to FIGS. 4 and 5 and the input image data are recorded on a security unit 6205. The image data recorded on the HDD 6204 in the job 6201 can be printed or sent at a later stage.

In a job 6301 including a FAX-received job or an I-FAX-received JOB, image data sent from a receiving source 6302 is recorded on an HDD 6304. During processing of a job, the log record described with reference to FIGS. 4 and 5 and the image data received from the receiving source 6302 are recorded on a security unit 6305. The image data recorded on the HDD 6304 in the job 6301 can be printed or sent at a later stage.

In a job 6401 including a FAX sending job or a SEND job, image data recorded on an HDD 6404, which is stored in the job 6201 or the job 6301, is read and sent to a sending destination 6403. The SEND job collectively refers to an image sending job performed by sending via e-mail or in a protocol, such as FTP or SMB, via the network I/F 2010.

During processing of the FAX sending job, the I-FAX sending job, or the SEND job, the log record described with reference to FIGS. 4 and 5 and reference information for identifying the image data sent to the sending destination 6403 are recorded on a security unit 6405.

In this case, actual image data is not recorded at the time of recording on the security unit 6405. Instead, reference information to be linked with the image data previously recorded on the security unit 6205 or the security unit 6305 is recorded on the security unit 6405. This is because actual image data to be subjected to the job 6401 is previously recorded as an input job log (input from a scanner or host) on the security unit 6205 or 6305 before performing the FAX sending job or the SEND job.

Thus, the same image data is not duplicatedly recorded. Accordingly, the processing can be performed at a higher speed and an amount of data to be recorded can be reduced. In verifying content of an image, the administrator of the data processing system can verify the image content by identifying actual image data recorded as an input job log using the reference information.

In a job 6501 including a received print job or a BOX print job, image data stored on an HDD 6504 in the job 6201 or the job 6301 is read and then output to a printer 6503.

During processing of the received print job or the BOX print job, the log record described with reference to FIGS. 4 and 5 and the reference information for the image output to the printer 6503 are recorded on a security unit 6505. This is because, in the received print job or the BOX print job, actual image data is already recorded as an input job log on the security unit 6505, just as described above.

In a PDL print job 6601, PDL data sent from the AS 1013 according to a instruction for printing generated by a TC 6602 or PDL data sent from a CC 6602 is rasterized to generate image data. The rasterized image data is temporarily recorded and stored on an HDD 6604, and then the image data is output to a printer 6603.

In an ordinary case, during processing a job, the log record described with reference to FIGS. 4 and 5 and the rasterized image data are recorded on a security unit 6605. However, according to security settings set for the multifunction peripheral 1001, the setting in this case can be altered such that the rasterized image data is not sent to the security unit 6605.

With a combined use of the above-described jobs, printing of the image data received in the FAX-received job can be performed in the print job or the scan image read in the SCAN job can be sent in the FAX sending job. The image data processed in all the jobs is recorded as a job log. At this time, actual image data is not duplicatedly recorded. Thus, a recording capacity of the security unit can be saved.

FIG. 7 illustrates an example of data stored in the security unit illustrated in FIG. 6. In this example, a method for storing an image on the security unit for each job kind is described.

Referring to FIG. 7, a job kind 7001 indicates a job kind such as "COPY" and "PDL print". A job type 7002 indicates a job type as to whether the type of a job is an input of image data or an output of image data.

Actual image data recording 7003 indicates a setting as to whether a job in which actual image data is recorded on the security unit is performed or a job in which only reference information for actual image data is recorded and actual image data is not recorded on the security unit is performed. A COPY job 7101 is an "input job" 7102 whose job type 7002 includes an input of an image. Accordingly, a parameter "YES" 7103 is set to the actual image data recording 7103 for the COPY job 7101.

A first PDL-PRINT job 7201 is received according to a print instruction from a client computer that is not a thin client. The first PDL-PRINT job 7201 is an "input job" 7202 whose job type 7002 includes an input of an image. Accordingly, a parameter "YES" 7203 is set to the actual image data recording 7203 for the PDL-PRINT job 7201.

A SCAN job/BOX storing job/form registration job 7301 is an "input job" 7302 whose job type 7002 includes an input of an image. Accordingly, a parameter "YES" 7303 is set to the actual image data recording 7303 for the SCAN job/BOX storing job/form registration job 7301.

A receiving job 7401 is an "input job" 7402 whose job type 7002 includes an input of an image. Accordingly, a parameter "YES" 7403 is set to the actual image data recording 7003 for the receiving job 7401.

A sending job 7501 is an "output job" 7502 whose job type 7002 does not include an input of an image. Accordingly, a parameter "NO" 7503 is set to the actual image data recording 7003 for the sending job 7501. In the sending job 7501, reference information for the actual image data recorded as an input job log is recorded instead of recording actual image data.

A BOX-PRINT job and received print job (BPJ) 7601 is an "output job" 7602 whose job type 7002 does not include an input of an image. Accordingly, a parameter "NO" 7603 is set to the actual image data recording 7003 for the BOX-PRINT job and received print job 7601. In the BOX-PRINT job and received print job 7601, reference information for the actual image data recorded as an input job log is recorded instead of recording actual image data.

A second PDL-PRINT job 7701 is a print job sent via the AS 1013 according to a print instruction from the TC 1010. The second PDL-PRINT job 7701 is an "input job" 7702 whose job type 7002 includes an input of an image. Accordingly, in an ordinary case, a parameter "YES" 7703 is set to the actual image data recording 7003 for the second PDL-PRINT job 7701. However, when an item "simplify job archiving from thin client" is set ON in the security setting for the multifunction peripheral 1001, a parameter "NO" 7703 is set to the actual image data recording 7003 for the second PDL-PRINT job 7701.

This is intended not to duplicatedly record actual image data when actual image data is stored in the AS 1013. In this case, in the second PDL-PRINT job 7701, reference information for the actual image data recorded on the AS 1013 is recorded.

Now, a flow of processing performed by the multifunction peripheral 1001, which is an example of an image processing apparatus according to the present exemplary embodiment, will be described below.

Figure 8:
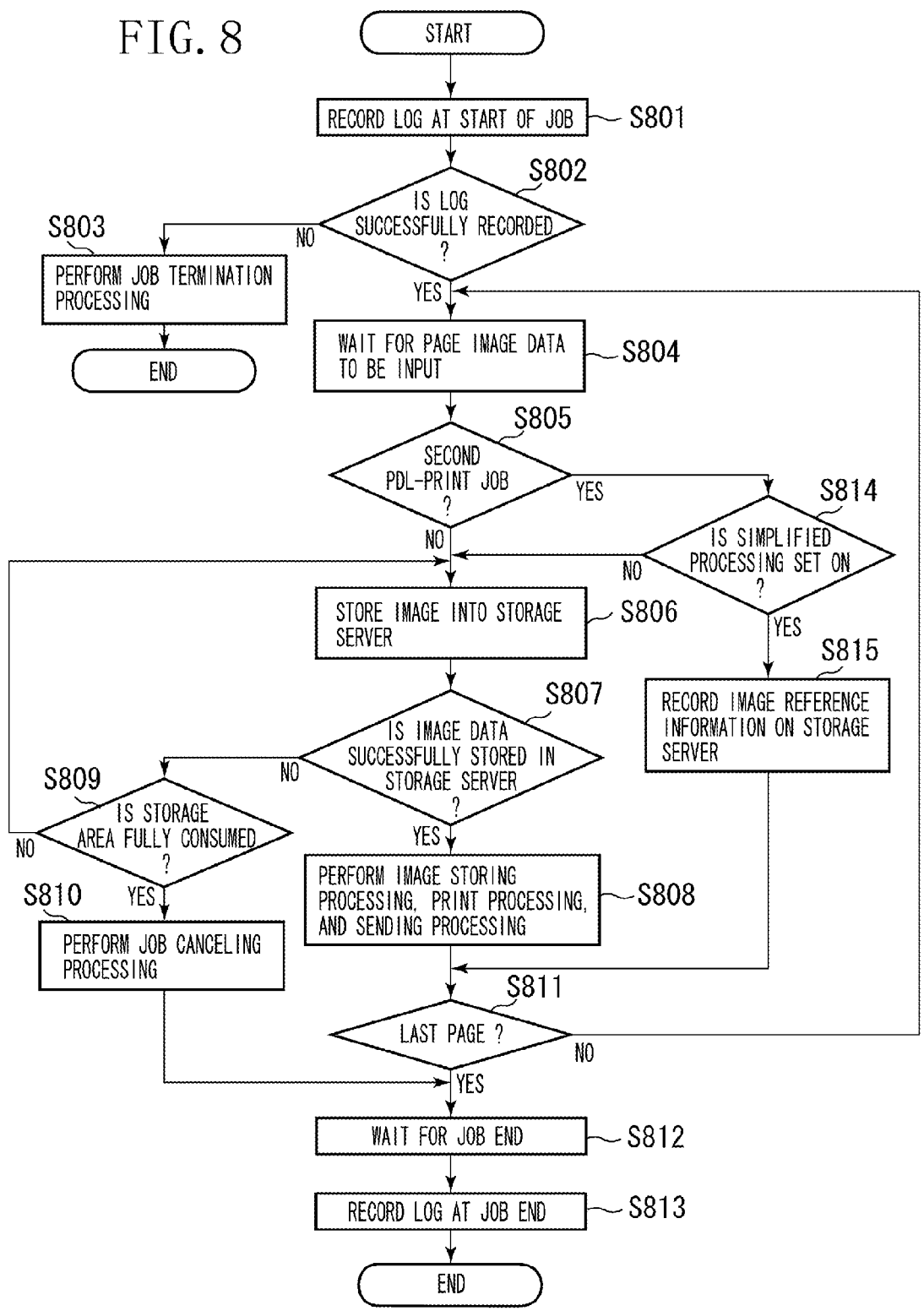
FIG. 8 is a flow chart illustrating data processing performed by the multifunction peripheral illustrated in FIG. 1 according to the first exemplary embodiment of the present invention.

FIG. 8 is a flow chart illustrating data processing performed by the multifunction peripheral 1001 according to the present exemplary embodiment. The example illustrated in FIG. 8 illustrates an example of processing for managing a job log performed by the multifunction peripheral 1001 illustrated in FIG. 2. Each step is implemented by the CPU 2001 illustrated in FIG. 2 executing a program loaded on the RAM 2002.

When processing of a job starts, in step S801, the CPU 2001 records a log at the start of the job. At this time, the CPU 2001 secures and allocates an area necessary for recording a log and writes therein an item defined at present, of the log records stored on the SS 1005, into the area.

In step S802, the CPU 2001 determines whether the log is successfully recorded on the SS 1005. If it is determined in step S802 that the log is not recorded on the SS 1005 or that an area necessary for writing the log is not secured (NO in step S802), then the CPU 2001 advances to step S803. In step S803, the CPU 2001 performs job termination processing to discontinue the processing of the job. When the job termination processing ends, the CPU 2001 ends the processing.

On the other hand, if it is determined in step S802 that the necessary area is secured and the log is successfully recorded (YES in step S802), then the CPU 2001 advances to step S804.

In step S804, the CPU 2001 waits for image data to be input. When image data for one page is input, the CPU 2001 advances to step S805. Here, when the job type 7002 of the job is an output of an image (output job), the input performed here is reading of image data from the HDD 2004.

In step S805, the CPU 2001 determines whether a job kind of the job is the second PDL-PRINT job 7701.

If it is determined in step S805 that the job kind of the job is a print job sent from the TC 1010 illustrated in FIG. 1 (YES in step S805), then the CPU 2001 advances to step S814. If it is determined in step S805 that the job kind of the job is other than a print job sent from the TC 1010 illustrated in FIG. 1 (NO in step S805), then the CPU 2001 advances to step S806.

In step S806, the CPU 2001 stores image data input in step S804 in the SS 1005. At the time of storing the image data in the SS 1005, the CPU 2001 adds an image ID unique to each page to the image data. In addition, at the time of storing the image data in the SS 1005, the CPU 2001 can perform conversion of a resolution of the image data and conversion of a color mode in which a color image is converted into a monochromatic image to compress the image data to reduce the data size thereof.

In the present exemplary embodiment, the image ID is expressed in a 32-digit ASCII character string including a "device serial number" (in 10-digit ASCII characters)+"image recording date and time (yymmddhhmmss)" (in 12-digit ASCII characters)+"serial number that the apparatus increments per each image recording" (10-digit ASCII characters). The image ID includes the same character string as that of a document ID so that correspondence between image data and its log record can be established.

In step S807, the CPU 2001 determines whether image data is successfully stored in the SS 1005. If it is determined in step S807 that the image data is successfully stored in the SS 1005 (YES in step S807), then the CPU 2001 advances to step S808. On the other hand, if it is determined in step S807 that the image data is not stored in the SS 1005 (NO in step S807), then the CPU 2001 advances to step S809.

In step S809, the CPU 2001 determines whether a cause of failing to store the image data in the SS 1005 is shortage of a storage area capacity. If it is determined in step S809 that the cause of failing to store the image data in the SS 1005 is shortage of a storage area capacity (YES in step S809), then the CPU 2001 determines that the image data cannot be written into the storage area, and then the CPU 2001 advances to step S810.

On the other hand, if it is determined in step S809 that the cause of failing to store the image data in the SS 1005 is not shortage of a storage area capacity (NO in step S809), then the CPU 2001 returns to step S806 to perform the writing processing again.

In step S810, the CPU 2001 performs job canceling processing, and then advances to step S812.

With performing the job canceling processing, failure of tracking of sending and printing-out of image data including confidential information, which can occur due to failure in storing the image data in the SS 1005 when the job is performed, can be avoided.

In step S808, when the job to be processed includes storing of the image data on the HDD 2004, the CPU 2001 stores the image data input in step S804 on the HDD 2004. In the present exemplary embodiment, the BOX-storing job, the SCAN job, and the receiving job include storage of image data on the HDD 2004. Furthermore, when the job to be processed includes printing of the image data, the CPU 2001 performs printing of the image data with the printer 2095. The COPY job and the PDL-PRINT job include printing of image data. When the job to be processed is a sending job, the CPU 2001 performs sending processing using the network I/F 2010 and the modem 2050.

In the above-described processing, storage of image data in the SS 1005 is confirmed in step S807. Accordingly, the image data to be printed or sent is always stored on the security unit. Thus, tracking of the job can be performed later. When the processing in step S808 is completely performed as described above, the CPU 2001 advances to step S811.

In step S814, the CPU 2001 determines whether the item "simplify job archiving from thin client" is set ON in the security setting for the multifunction peripheral 1001. If it is determined in step S814 that the item "simplify job archiving from thin client" is set ON in the security setting for the multifunction peripheral 1001 (YES in step S814), then the CPU 2001 advances to step S815.

On the other hand, if it is determined in step S814 that the item "simplify job archiving from thin client" is set OFF in the security setting for the multifunction peripheral 1001 (NO in step S814), then the CPU 2001 advances to step S806. In step S806, the CPU 2001 performs the same processing as the processing performed for an ordinary job sent from a client.

In this case, the CPU 2001 records actual image data on the SS 1005. In this regard, in order to suppress a waste of recording capacity due to duplicated recording of actual image data, the CPU 2001 can instruct erasing thereof to the AS 1013.

In step S815, the CPU 2001 records reference information for the actual image data related to the job instructed by the TC 1010, which is recorded on the AS 1013. In this case, the CPU 2001 can generate an instruction for inhibiting erasing of the actual image data to the AS 1013. Processing then advances to step S811.

In step S811, the CPU 2001 determines whether the image data received in step S804 is the last page. If it is determined in step S811 that the image data received in step S804 is the last page (YES in step S811), then the CPU 2001 advances to step S812. On the other hand, if it is determined in step S811 that the image data received in step S804 is not the last page (NO in step S811), then the CPU 2001 advances to step S804 to wait for the next image data to be input.

In step S812, the CPU 2001 waits for the end of the job. In step S813, the CPU 2001 records a log of items that have not been defined yet at the time of performing the processing in step S801 such as job result 4008 (namely, a result obtained after completion of a job) on the SS 1005. When the processing for recording a log ends, the CPU 2001 ends the processing.

Figure 9:
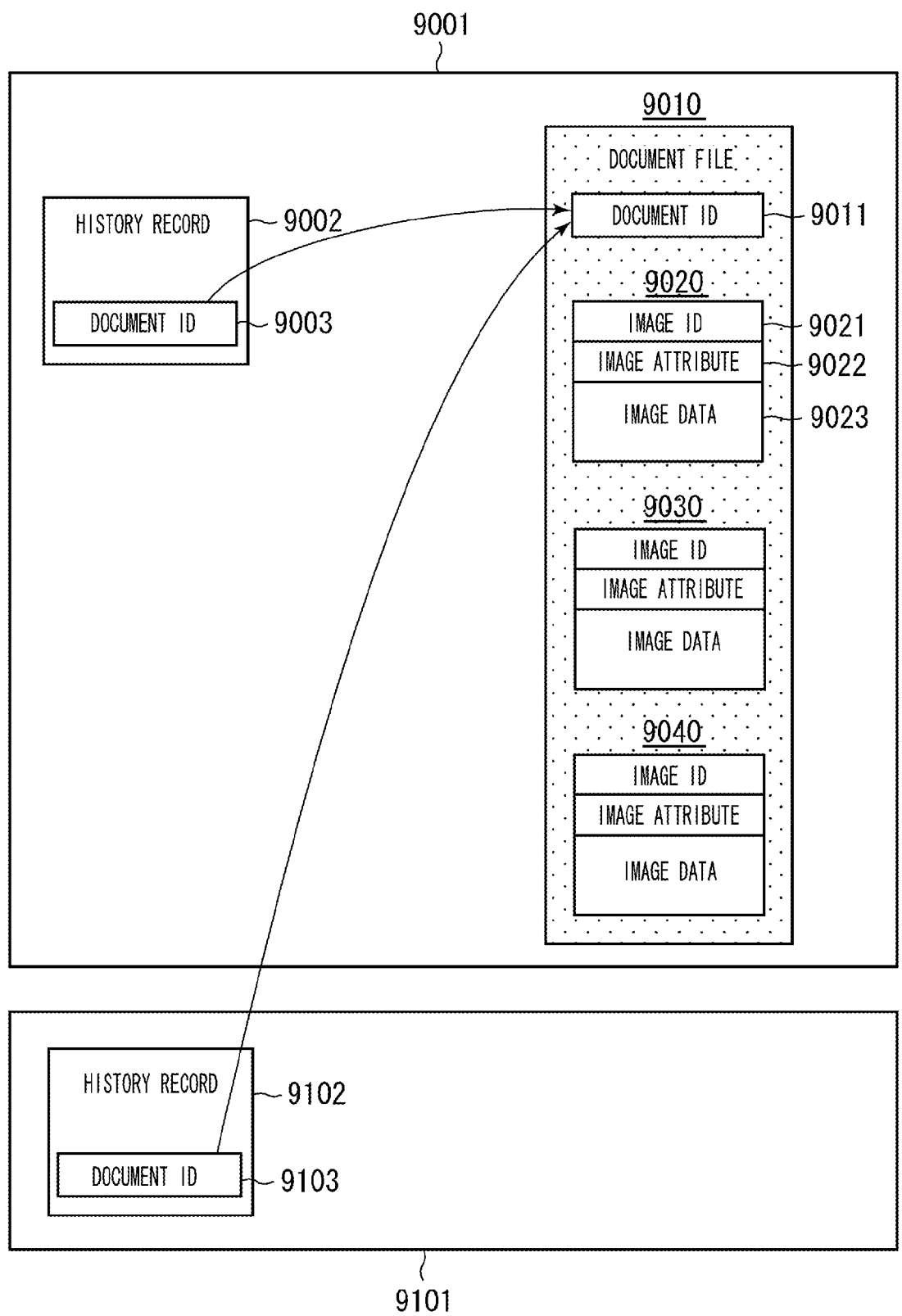
FIG. 9 illustrates an example of writing of a job log from the multifunction peripheral illustrated in FIG. 1 on the storage server according to the first exemplary embodiment of the present invention.

FIG. 9 illustrates an example of writing of a job log from the multifunction peripheral 1001 illustrated in FIG. 1 onto the SS 1005. The example illustrated in FIG. 9 shows an example of storing image data on the security unit in the SS 1005.

Referring to FIG. 9, a job 9001 is an input job whose job type 7002 illustrated in FIG. 7 is an input job. The job 9001 includes the BOX-storing job 7301, for example. A job 9101 is an output job whose job type 7002 is an output job. The job 9101 includes the BOX-PRINT job 7601, for example. In the output job 9101, image data input in the input job 9001 is output.

For a job log of the input job 9001, a document file 9010 including a log record (history record) 9002 and actual image data is recorded on the SS 1005. The log record 9002 includes the items 4001 through 4022 illustrated in FIG. 4, including a document ID 9003. The document file 9010 includes a document ID 9011 and image data 9020, 9030, and 9040.

Using the document ID 9011 and the document ID 9003, the document file 9010 and the log record 9002 are linked with each other, and thus a relationship between the document file 9010 and the log record 9002 is expressed. The image data 9020 includes an image ID 9021, an image attribute 9022, and image data 9023.

The image ID 9021 is uniquely provided to each actual image data. The image attribute 9022 indicates whether the image data 9023 is color or monochromatic and an image format. The image data 9023 is actual image data itself. In the SS 1005, one document includes one file, which can include a plurality of pages (images), as illustrated in FIG. 9.

In the output job 9101, one unique document ID 9103 is provided to one document. The output job 9101 can include a print job generated by simple processing of a print job from the TC 1010. In this case, a log record 9102 is recorded on the SS 1005.

In the job log for the output job 9101, a document file is already recorded in the input job. Accordingly, no document file to be recorded exists. By recording the same value as the value for the document ID 9011 previously recorded in the input job for the document ID 9103, the document file output in the output job 9101 can be identified.

In the case of a print job from the TC 1010 illustrated in FIG. 1, because the print jobs are centrally managed by the AS 1013, the image data and the output result can be managed by a server with respect to all the print jobs. Accordingly, in performing a print job sent from the TC 1010, reference information for actual image data stored in the AS 1013 is recorded on the SS 1005 instead of recording the actual image data at the time of output.

Thus, the amount of data to be recorded on the SS 1005 can be reduced, and lowering of the speed of processing a job in the image processing apparatus can be effectively avoided. Furthermore, reference information for the actual image data stored in the AS 1013 is recorded on the SS 1005. Accordingly, the actual image data can also be readily identified. In the case of processing a print job sent from the TC 1010, actual image data can be recorded on the SS 1005. In this case, it is useful to erase actual image data from the AS 1013 so that the same image data is not duplicatedly recorded.

According to the above-described exemplary embodiment, under an environment in which a thin client machine is in communication with a server, the job archiving function can be effectively implemented. In addition, under an environment in which a thin client machine and an ordinary client machine exist at the same time, the job archiving function can be effectively implemented.

Second Exemplary Embodiment

In the first exemplary embodiment, in order not to duplicatedly store actual image data, in the case of printing according to an instruction from the TC 1010, output image data from the multifunction peripheral is not stored on the SS 1005, and instead, reference information for the image data on the AS 1013 is stored on the SS 1005. However, instead of storing image data from the multifunction peripheral at the time of printing, PDL data from the AS 1013 can be directly stored on the SS 1005.

Figure 10:
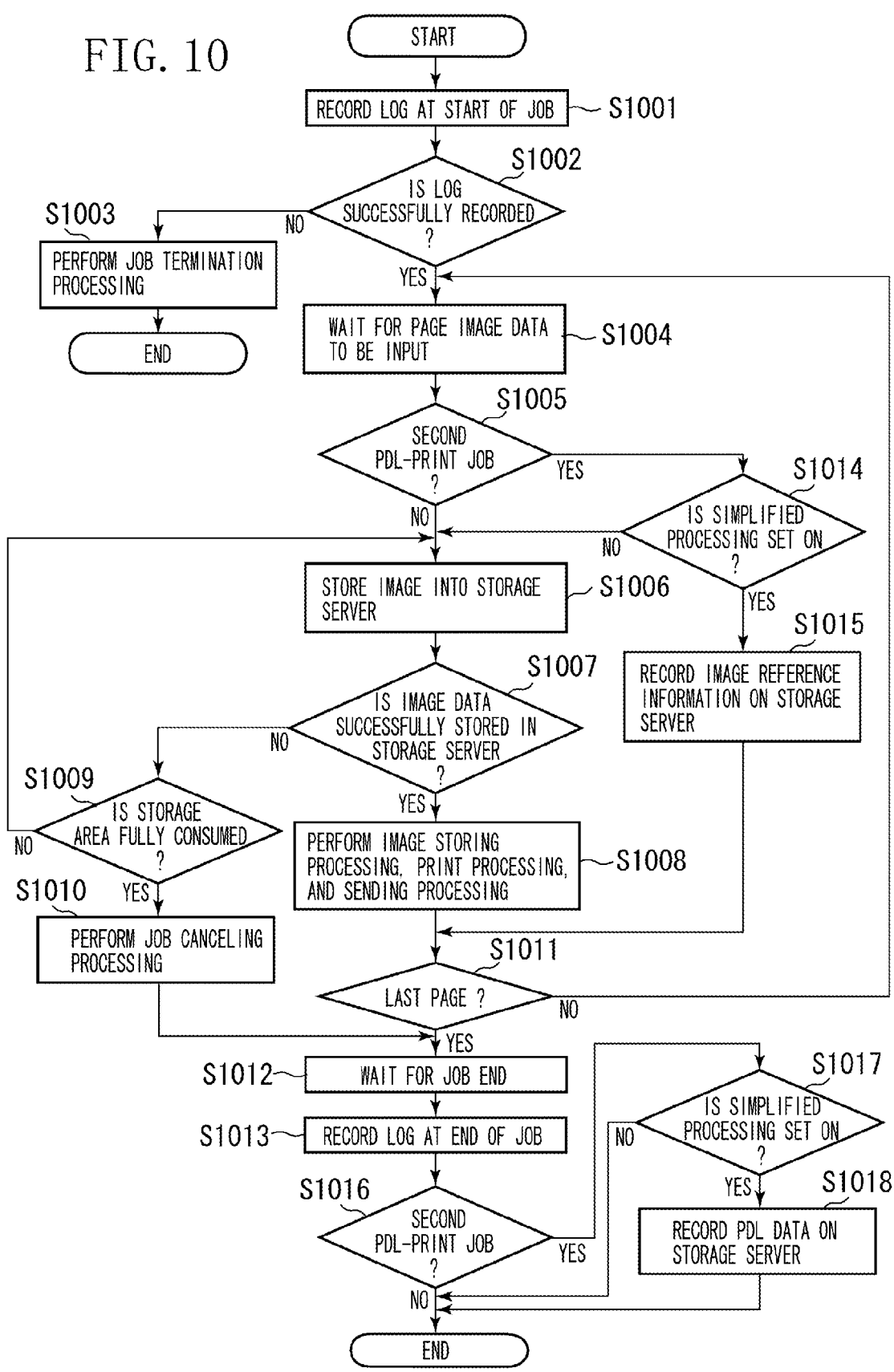
FIG. 10 is a flow chart illustrating data processing performed by a multifunction peripheral illustrated in FIG. 1 according to a second exemplary embodiment of the present invention.

FIG. 10 is a flow chart illustrating data processing performed by a multifunction peripheral according to a second exemplary embodiment of the present invention. The example in FIG. 10 illustrates processing for managing a job log by the multifunction peripheral 1001 illustrated in FIG. 2. Each step is performed by the CPU 2001 illustrated in FIG. 2 by executing a control program loaded on the RAM 2002.

Referring to FIG. 10, when processing of a job starts, in step S1001, the CPU 2001 records a log at the start of the job. In step S1002, the CPU 2001 determines whether the log is successfully recorded on the SS 1005. If it is determined in step S1002 that the log is not recorded on the SS 1005 or that an area necessary for writing the log is not secured (NO in step S1002), then the CPU 2001 advances to step S1003. In step S1003, the CPU 2001 performs job termination processing to discontinue the processing of the job. When the job termination processing ends, the CPU 2001 ends the processing.

On the other hand, if it is determined in step S1002 that the necessary area is secured and the log is successfully recorded (YES in step S1002), then the CPU 2001 advances to step S1004.

In step S1004, the CPU 2001 waits for image data to be input. When image data for one page is input, the CPU 2001 advances to step S1005. In step S1005, the CPU 2001 determines whether a job type of the job is the second PDL-PRINT job, namely, whether there is an instruction for processing the job is generated from the TC 1010.

If it is determined in step S1005 that the job type of the job is a print job sent from the TC 1010 illustrated in FIG. 1 (YES in step S1005), then the CPU 2001 advances to step S1014. If it is determined in step S1005 that the job type of the job is other than a print job sent from the TC 1010 illustrated in FIG. 1 (NO in step S1005), then the CPU 2001 advances to step S1006.

In step S1006, the CPU 2001 stores image data input in step S1004 in the SS 1005. In step S1007, the CPU 2001 determines whether all image data is successfully stored in the SS 1005. If it is determined in step S1007 that all the image data is successfully stored in the SS 1005 (YES in step S1007), then the CPU 2001 advances to step S1008. On the other hand, if it is determined in step S1007 that not all the image data is stored in the SS 1005 (NO in step S1007), then the CPU 2001 advances to step S1009.

In step S1009, the CPU 2001 determines whether a cause of failing to store the image data in the SS 1005 is shortage of a storage area capacity. If it is determined in step S1009 that the cause of failing to store the image data in the SS 1005 is shortage of a storage area capacity (YES in step S1009), then the CPU 2001 determines that the image data cannot be written into the storage area, and then the CPU 2001 advances to step S1010. On the other hand, if it is determined in step S1009 that the cause of failing to store the image data in the SS 1005 is not shortage of a storage area capacity (NO in step S1009), then the CPU 2001 returns to step S1006 to perform the writing processing again.

In step S1010, the CPU 2001 performs job canceling processing, and then advances to step S1012. With performing the job canceling processing, sending and printing-out of image data that is not stored in the SS 1005 can be prevented.

In step S1008, when the job to be processed includes storing of the image data on the HDD 2004, the CPU 2001 stores the image data input in step S1004 on the HDD 2004. Furthermore, when the job to be processed includes printing of the image data, the CPU 2001 performs printing of the image data with the printer 2095. When the job to be processed is a sending job, the CPU 2001 performs sending processing using the network I/F 2010 and the modem 2050.

In the above-described processing, storage of image data in the SS 1005 is confirmed in step S1007. Accordingly, the image data to be printed or sent is always stored on the security unit. Thus, tracking of the job can be performed later.

When the processing in step S1008 is completely performed as described above, the CPU 2001 advances to step S1011.

In step S1014, the CPU 2001 determines whether the item "simplify job archiving from thin client" is set ON in the security setting for the multifunction peripheral 1001. If it is determined in step S1014 that the item "simplify job archiving from thin client" is set ON in the security setting for the multifunction peripheral 1001 (YES in step S1014), then the CPU 2001 advances to step S1015.

On the other hand, if it is determined in step S1014 that the item "simplify job archiving from thin client" is set OFF in the security setting for the multifunction peripheral 1001 (NO in step S1014), then the CPU 2001 advances to step S1006. In step S1006, the CPU 2001 performs the same processing as that in an ordinary input job.

In step S1015, instead of recording actual image data, the CPU 2001 records reference information for the actual image data on the AS 1013. Processing then proceeds to step S1011.

In step S1011, the CPU 2001 determines whether the image data received in step S1004 is the last page. If it is determined in step S1011 that the image data received in step S1004 is the last page (YES in step S1011), then the CPU 2001 advances to step S1012. On the other hand, if it is determined in step S1011 that the image data received in step S1004 is not the last page (NO in step S1011), then the CPU 2001 advances to step S1004 to wait for the next image data to be input.

In step S1012, the CPU 2001 waits for the end of the job. In step S1013, the CPU 2001 records a log of items that have not been defined yet at the time of performing the processing in step S1001 such as job result 4008 on the SS 1005.

In step S1016, the CPU 2001 determines whether a job kind of the job is the second PDL-PRINT job, namely, whether there is an instruction for processing the job is generated from the TC 1010. If it is determined in step S1016 that the job kind of the job is a print job sent from the TC 1010 illustrated in FIG. 1 (YES in step S1016), then the CPU 2001 advances to step S1017. If it is determined in step S1016 that the job kind of the job is other than a print job sent from the TC 1010 illustrated in FIG. 1 (NO in step S1016), then the CPU 2001 ends the processing.

In step S1017, the CPU 2001 determines whether the item "simplify job archiving from thin client" is set ON in the security setting for the multifunction peripheral 1001. If it is determined in step S1017 that the item "simplify job archiving from thin client" is set ON in the security setting for the multifunction peripheral 1001 (YES in step S1017), then the CPU 2001 advances to step S1018. On the other hand, if it is determined in step S1017 that the item "simplify job archiving from thin client" is set OFF in the security setting for the multifunction peripheral 1001 (NO in step S1017), then the CPU 2001 ends the processing.

In step S1018, the CPU 2001 generates an instruction to the AS 1013 for sending the PDL data used in printing to the SS 1005. After receiving the instruction from the CPU 2001, the SS 1005 records the PDL data, instead of the image data, with linking the PDL data to the log record. Then, the CPU 2001 ends the processing. Note that instead of performing the processing in step S1018, another different processing can be performed in which when the AS 1013 receives status information indicating that the print processing has ended from the multifunction peripheral 1001, the AS 1013 sends the PDL data used for printing to the SS 1005 and records the PDL data on the SS 1005. Alternatively, the SS 1005 can request the AS 1013 to send the PDL data related to the job to the SS 1005.

In addition, in a case where the PDL data is recorded on the SS 1005 in step S1018, the amount of data to be recorded can be reduced by erasing the image data and the reference information recorded in step S1015.

According to the second exemplary embodiment described above, the administrator of the system verifies the content of the image after the image data is rasterized. In this regard, since the image is stored as PDL data, the amount of data to be recorded can be reduced.

Furthermore, the data received from the AS 1013 is PDL data. Accordingly, in most cases, a character portion is described in character code. Accordingly, the SS 1005 can more easily create a search index.

Third Exemplary Embodiment

Now, a third exemplary embodiment of the present invention will be described below. In each of the above-described first and the second exemplary embodiments, the multifunction peripheral is described, which is an image processing apparatus that processes a job, having the job archiving function, namely, the function for sending image data related to a job and a result of processing to the SS 1005 at the time of processing the job. In an actual office environment, a printing apparatus that does not support the job archiving function can be used.

In this regard, in the third exemplary embodiment, an example is described in which under the above-described system environment, the SS 1005 can manage a print job whose processing is instructed to a printing apparatus that does not support the job archiving function, with the SS 1005 and the AS 1013 operating in cooperation.

Figure 11:
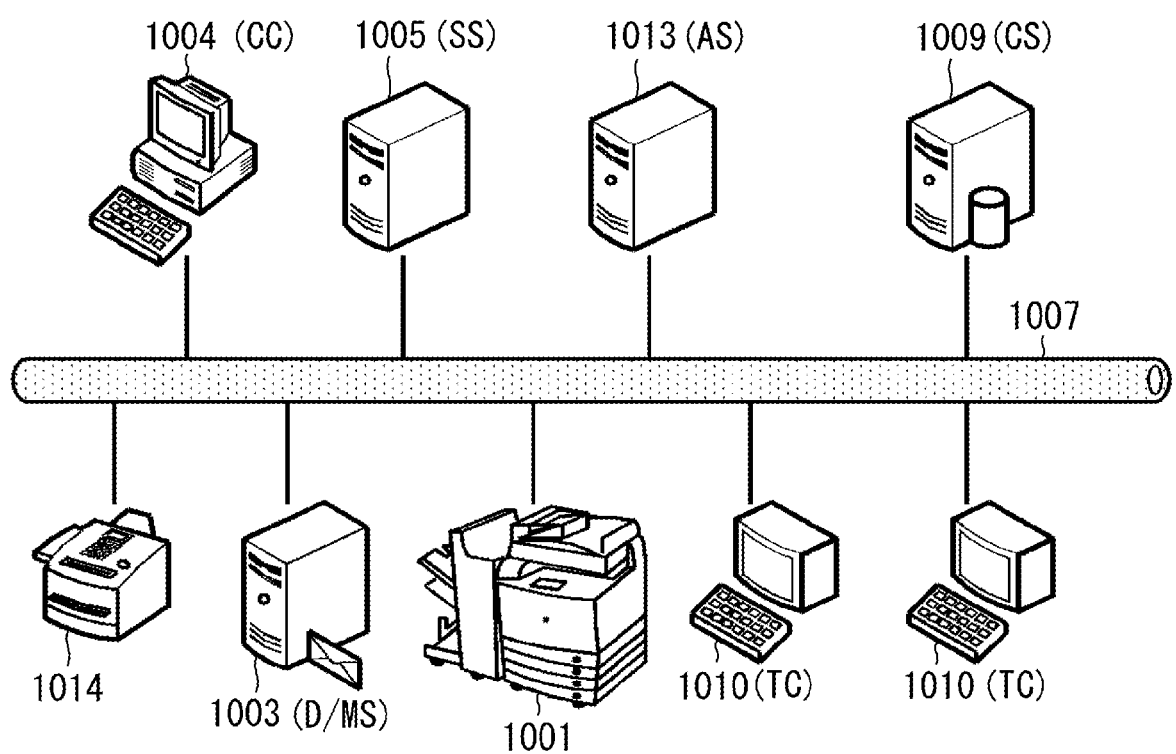
FIG. 11 illustrates an example of a data processing system according to a third exemplary embodiment of the present invention.

FIG. 11 illustrates an example of a data processing system according to the third exemplary embodiment. Components and units that are similar to those illustrated in FIG. 1 are denoted by the same reference numerals and symbols as in FIG. 1, and a description thereof is not repeated here.

Referring to FIG. 11, a multifunction peripheral 1014 does not support the job archiving function. The CC 1004 and the TC 1010 can send an instruction for printing to both the multifunction peripheral 1001 and the multifunction peripheral 1014.

The SS 1005 records a print job for the multifunction peripheral 1001. As in the case of the second exemplary embodiment, the SS 1005 can record PDL data from the AS 1013. The AS 1013, in a case where the multifunction peripheral 1014 performs printing according to an instruction from the TC 1010, sends PDL data and print log data to the SS 1005 after printing, and allows the SS 1005 to record thereon the PDL data and print log data. After sending the PDL data, the AS 1013 erases the PDL data.

The third exemplary embodiment differs from the second exemplary embodiment in that in the second exemplary embodiment, the image reference information and the log information are sent from the multifunction peripheral 1001, which supports the job archiving function, to the SS 1005, while in the third exemplary embodiment, the AS 1013 sends print log information to the SS 1005.

The AS 1013 can send reference information for identifying PDL data stored on the AS 1013 to the SS 1005 instead of sending PDL data. In this case, the AS 1013 does not erase the PDL data and continues storing therein the PDL data.

Furthermore, the AS 1013 can perform the above-described sending processing in response to a request from the SS 1005 instead of actively sending PDL data or reference information.

In the present exemplary embodiment, if the SS 1005 determines that the multifunction peripheral 1001 supports the job archiving function and can send a job log, the SS 1005 receives the job log and image data from the multifunction peripheral 1001. At that time, the SS 1005 instructs the AS 1013 to erase PDL data. However, when the setting of the SS 1005 is performed so that the PDL data is stored even if the multifunction peripheral 1001 supports the job archiving function, the same processing as described in the second exemplary embodiment is performed.

That is, the SS 1005 receives a log record from the multifunction peripheral 1001 and PDL data from the AS 1013, and records the received log record and PDL data while linking the log record to the PDL data. At that time, when the SS 1005 has received image data and reference information from the multifunction peripheral 1001, the SS 1005 erases the received image data and reference information. When the SS 1005 has not received image data and reference information from the multifunction peripheral 1001, the SS 1005 sends an instruction for erasing or information permitting erasure to the multifunction peripheral 1001.

According to the present exemplary embodiment, in the case of printing by a printing apparatus that does not support the job archiving function, the SS 1005 can manage a print image and log information according to a request for printing from the TC 1010.

In the present exemplary embodiment, it is useful that only a thin-client machine can send a print job and an image processing apparatus performing the print job with an apparatus that does not support the job archiving function can perform only the print job. This is intended to avoid leakage of confidential information by performing printing without using the AS 1013 and to prevent a job other than the print job, such as a COPY job, from being performed by an apparatus that does not support the job archiving function.

Fourth Exemplary Embodiment

Now, a fourth exemplary embodiment of the present invention will be described below. In the above-described exemplary embodiments, the TC 1010 illustrated in FIG. 1 is used only for displaying screen data, and all application data and significant data is stored in an application server. However, there is another type of the TC 1010 that includes an HDD having minimum functions. When such a type of TC 1010 is used, an application and a printer driver can run on the TC 1010.

In this regard, in the present exemplary embodiment, an example is described in which printing and outputting can be managed in a case where printing is performed by a printing apparatus that the TC 1010 cannot manage under a mobile network environment.

Figure 12:
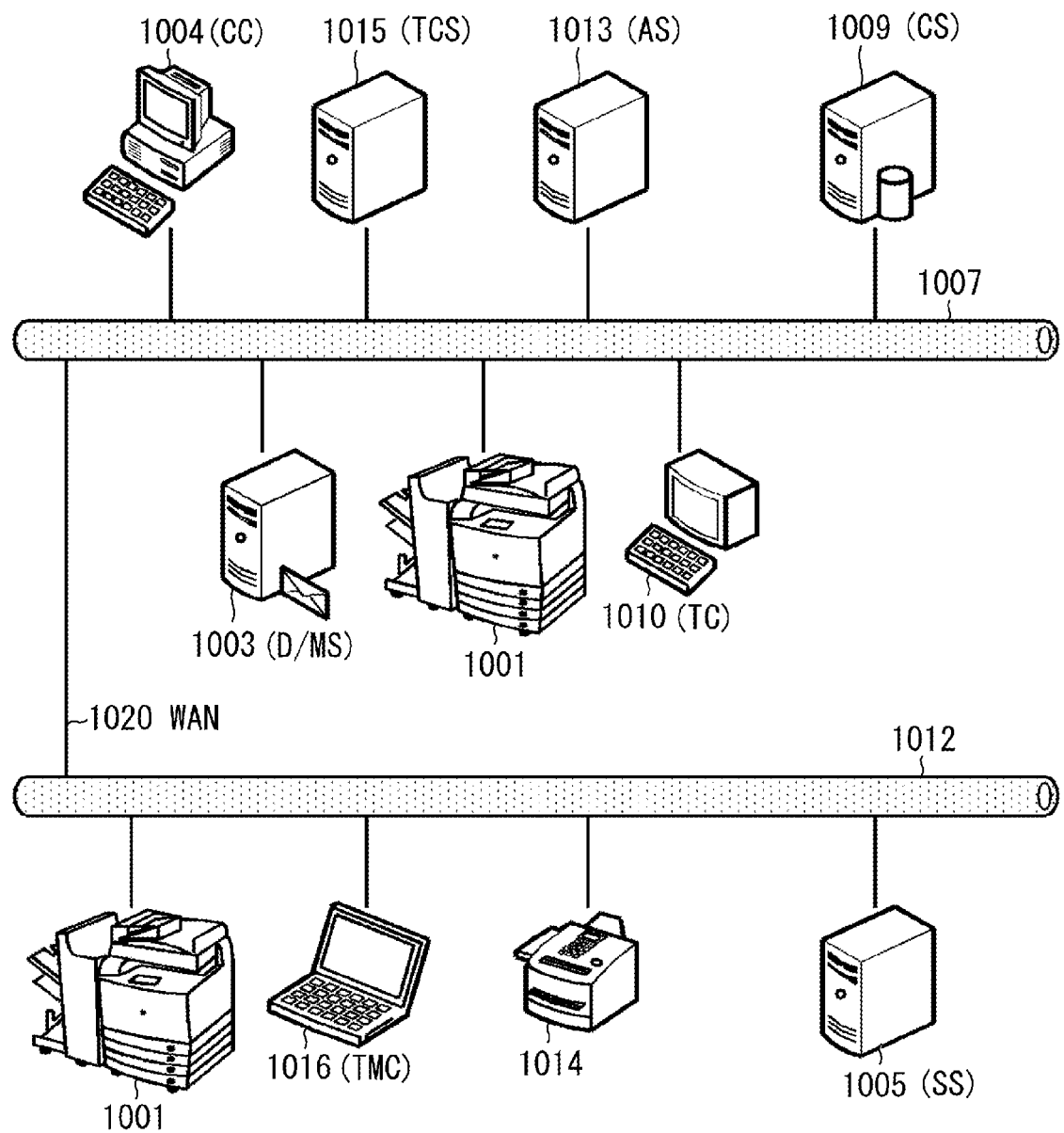
FIG. 12 illustrates an example of a data processing system according to a fourth exemplary embodiment of the present invention.

FIG. 12 illustrates an example of a data processing system according to the fourth exemplary embodiment. Components and units that are similar to those illustrated in FIG. 1 and FIG. 11 are denoted by the same reference numerals and symbols as in FIG. 1 and/or FIG. 11, and a description thereof is not repeated here.

Referring to FIG. 12, a thin-client server (TCS) 1015 stores and manages user data from the TC 1010. A thin-client mobile computer (TMC) 1016 is in communication with the TCS 1015 via a virtual private network (VPN) or dial-up connection.

The TMC 1016 includes an application and a printer driver, and is capable of directly printing with a printing apparatus on a LAN.

In the present exemplary embodiment, the multifunction peripheral 1001 is a printing apparatus having the job archiving function and the multifunction peripheral 1014 is a printing apparatus that does not have the job archiving function.

In printing image data sent from the TC 1010 with the multifunction peripheral 1001, the image data is sent to the SS 1005 after printing is completed. At that time, the TC 1010 sends a print log to the TCS 1015. The TCS 1015 stores and manages the print log. When the print image data is needed, the administrator of the data processing system can obtain the printed image data by tracking in the SS 1005 based on the print log.

In printing image data sent from the TC 1010 with the multifunction peripheral 1014, the print PDL data is sent to the TCS 1015 together with a print log after printing is completed. Thus, the TCS 1015 can manage the print image.

According to the exemplary embodiments described above, an application server and a storage server operate in cooperation according to a form of communication thereof with each device in the data processing system. Thus, the amount of data to be subjected to the job archiving function can be reduced while print data can be appropriately managed.

Furthermore, even when a thin client performs printing with a printing apparatus in a case where a server corresponding to the thin client is unknown, output print data can be appropriately managed.

Other Exemplary Embodiments

Figure 13:
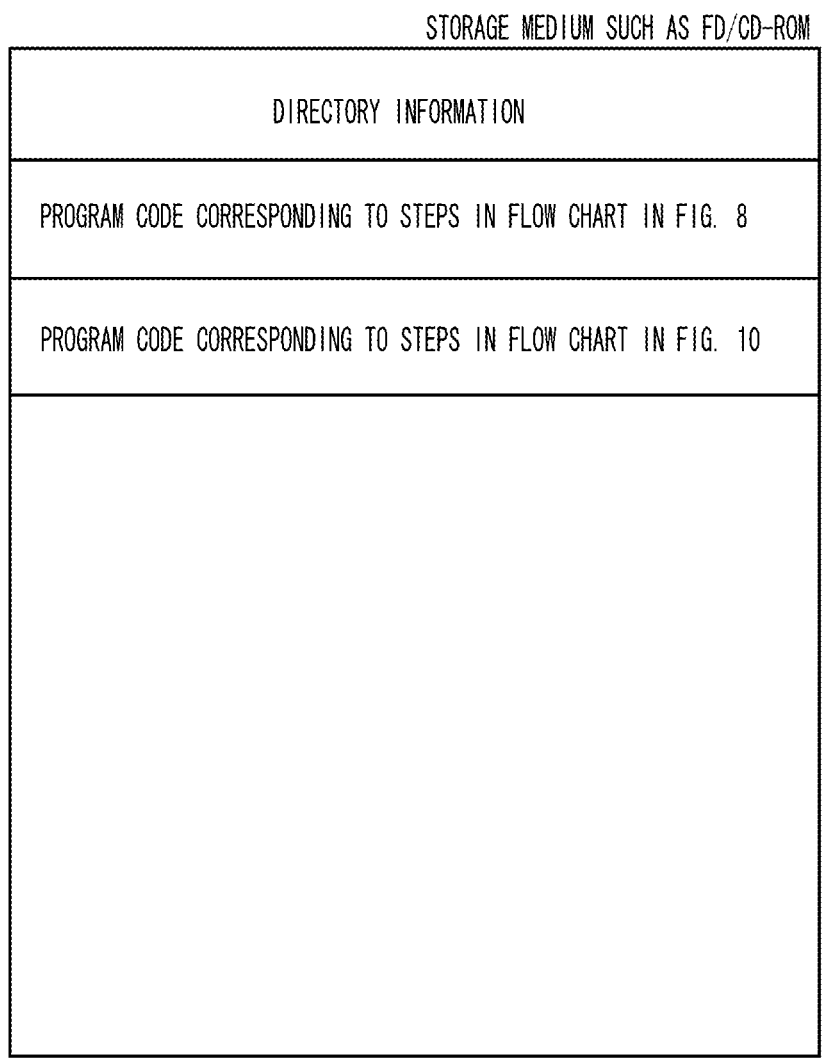
FIG. 13 illustrates a memory map of a storage medium that stores various data processing programs that can be read by the multifunction peripheral illustrated in FIG. 1 according to an exemplary embodiment of the present invention.

FIG. 13 illustrates a memory map of a storage medium that stores various data processing programs that can be read by the image processing apparatus according to an exemplary embodiment of the present invention.

Although not illustrated, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in a case where a program to be installed is compressed, a program for decompressing the compressed program can be stored in the storage medium.

In addition, the functions according to the above-described exemplary embodiments shown in FIG. 8 and FIG. 10 can be implemented by a host computer using a program that is externally installed. In this case, the present invention is applied to the case where a group of information including a program is supplied to an output device from a storage medium such as a CD-ROM, a flash memory, and a floppy disk (FD) or from an external storage medium through a network.

The present invention can also be achieved by providing a system or an apparatus with a storage medium storing program code (software) implementing the functions of the embodiments and by reading and executing the program code stored in the storage medium with a computer of the system or the apparatus (a central processing unit (CPU) or a micro processing unit (MPU)).

In this case, the program code itself, which is read from the storage medium, implements the functions of the embodiments described above.

Accordingly, the program can be configured in any form, such as object code, a program executed by an interpreter, and script data supplied to an operating system (OS).

As the storage medium for supplying such program code, a flexible disk, a hard disk, an optical disk, a magneto-optical disk (MO), a compact disc—read-only memory (CD-ROM), a compact disc—recordable (CD-R), a compact disc rewritable (CD-RW), a magnetic tape, a nonvolatile memory card, a read-only memory (ROM), and a digital versatile disc (DVD), for example, can be used.

In this case, the program code itself, which is read from the storage medium, implements the function of the embodiments mentioned above.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a world wide web (WWW) server or a file transfer protocol (FTP) server for allowing a plurality of users to download the program file for implementing the functional processing configures the present invention.

In addition, the above program can also be supplied by distributing a storage medium such as a CD-ROM and the like which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to the above-described exemplary embodiments of the present invention, when a request for processing a job is generated from a thin-client machine, with effectively using a limited amount of a memory resource, a data processing system capable of managing a log of job information can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-143989 filed May 24, 2006, which is hereby incorporated by reference herein in its entirety.

What is claimed is:

1. An image processing apparatus configured for processing a job transmitted from a management server according to an instruction by a thin-client machine, or for processing a job transmitted from a non-thin client machine, the image processing apparatus comprising:
    a determination unit configured to determine whether a transmission source of the image data is the thin-client machine or the non thin-client machine; and
    a registration unit configured to register image data of the job and a processing result of the job as log information in a storage unit which manages the log information if the determination unit determines that the transmission source of the image data is the non thin-client machine, and to register identification information for identifying image data of the job which is stored in the management server and a processing result of the job as log information in the storage unit without registering the image data of the job in the storage unit as the log information if the determination unit determines that the transmission source of the image data is the thin-client machine.

2. The image processing apparatus according to claim 1, further comprising a discriminating unit configured to discriminate a type of a job for processing the image data,
    wherein the registration unit is configured to register the image data if the determination unit determines that the transmission source of the image data is the non thin-client machine and the discrimination unit discriminates that the type of the job is an input job.

3. The image processing apparatus according to claim 1, wherein the registration unit is configured to register at least one of information for identifying an apparatus that has processed the image data, a date when the image data has been processed, and information for identifying a user who has requested processed the image data as the processing result.

4. The image processing apparatus according to claim 1, further comprising:
a printing unit configured to print, based on the image data, an image on a sheet.

5. A control method for controlling an image processing apparatus for processing a job transmitted from a management server according to an instruction by a thin-client machine, or for processing a job transmitted from a non-thin client machine, comprising:
determining whether a transmission source of the image data is the thin-client machine or the non thin-client machine; and
registering image data of the job and a processing result of the job as log information in a storage unit which manages the log information if it is determined that the transmission source of the image data is the non thin-client machine, and registering identification information for identifying image data of the job which is stored in the management server and a processing result of the job as log information in the storage unit without registering the image data of the job in the storage unit as the log information if it is determined that the transmission source of the image data is the thin-client machine.

* * * * *